United States Patent
Surnilla

(10) Patent No.: US 6,735,939 B2
(45) Date of Patent: May 18, 2004

(54) SYSTEM AND METHOD FOR MONITORING AND EXHAUST GAS SENSOR IN AN ENGINE

(75) Inventor: Gopichandra Surnilla, West Bloomfield, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 139 days.

(21) Appl. No.: 09/992,890

(22) Filed: Nov. 26, 2001

(65) Prior Publication Data
US 2003/0098008 A1 May 29, 2003

(51) Int. Cl.⁷ ................................. F01N 3/00
(52) U.S. Cl. ........................ 60/285; 60/274; 60/276
(58) Field of Search .................. 60/274, 285, 276; 73/116, 117.3, 118.1; 123/672, 673

(56) References Cited

U.S. PATENT DOCUMENTS

| 5,121,947 A | 6/1992 | Lee, III et al. | |
| 5,485,382 A | * 1/1996 | Seki et al. | 701/109 |
| 5,528,932 A | * 6/1996 | Bauer et al. | 73/118.1 |
| 5,672,817 A | * 9/1997 | Sagisaka et al. | 73/118.1 |
| 6,167,754 B1 | * 1/2001 | Koenders | 73/116 |
| 2001/0010220 A1 | 8/2001 | Shinjyo et al. | |

FOREIGN PATENT DOCUMENTS

| EP | 1118758 A2 | 7/2001 |
| EP | 1134378 A2 | 9/2001 |

* cited by examiner

Primary Examiner—Thomas Denion
Assistant Examiner—Diem Tran
(74) Attorney, Agent, or Firm—Allan J. Lippa

(57) ABSTRACT

A system and method for monitoring a post-catalyst exhaust gas sensor in an engine is provided. The engine includes a cylinder bank coupled to a catalyst and an exhaust gas sensor disposed downstream of the catalyst generating a first signal. The method includes supplying a rich air-fuel mixture to the cylinder bank. The method further includes supplying a lean air-fuel mixture to the cylinder bank to supply oxygen to the catalyst. Finally, the method includes indicating the exhaust gas sensor is degraded when the first signal does not indicate a lean air-fuel ratio after supplying the lean air-fuel mixture for a first predetermined time period.

7 Claims, 6 Drawing Sheets

SYSTEM AND METHOD FOR MONITORING AND EXHAUST GAS SENSOR IN AN ENGINE

FIELD OF THE INVENTION

The invention relates to a system and a method for monitoring an exhaust gas sensor in an engine downstream of an exhaust catalyst.

BACKGROUND OF THE INVENTION

To meet current emission regulations, automotive vehicles must regulate the air/fuel ratio supplied to the vehicles' engine cylinders to achieve maximum efficiency of exhaust gas catalysts. For this purpose, it is known to control the air/fuel ratio of internal combustion engines using an exhaust gas oxygen sensor positioned in the exhaust stream from the engine. The exhaust gas sensor provides feedback data to an electronic controller that calculates desired air/fuel ratio values over time to achieve optimum efficiency of a catalyst in the exhaust system. It is also known to have a system with two exhaust gas sensors in the exhaust stream in an effort to achieve more precise air/fuel ratio control with respect to a catalyst operational window. Normally, a pre-catalyst exhaust gas oxygen sensor is positioned upstream of the catalyst and a post-catalyst exhaust gas oxygen sensor is positioned downstream of the catalyst.

In connection with an engine having two groups of cylinders, it is known to have two exhaust manifolds coupled thereto where each exhaust manifold has a catalyst as well as pre-catalyst and post-catalyst exhaust gas sensors. Each of the exhaust manifolds corresponds to a group of cylinders in the engine. The feedback signal received form the exhaust gas sensors are used to calculate the desired air/fuel values in their respective group of cylinders at any given time.

Known engine control systems have also implemented strategies for determining when a pre-catalyst exhaust gas sensor becomes degraded. However, known engine control systems assume that post-catalyst exhaust gas sensors do not degrade since the sensors are buffered from a majority of the exhaust gases by an upstream catalyst. Thus, when a post-catalyst exhaust gas sensor does degrade, an engine control system using a degraded output signal from the post-catalyst exhaust gas sensor will be unable to maintain optimal air/fuel mixtures for optimal catalyst efficiency. Thus, the degraded sensor may result in increased emissions and decreased fuel economy.

The inventors herein have recognized that there is a need for a system and method that determines when a post-catalyst sensor becomes degraded.

SUMMARY OF THE INVENTION

The foregoing problems and disadvantages are overcome by a system and a method for monitoring a post-catalyst exhaust gas sensor in an engine in accordance with the present invention. The engine includes a first cylinder bank coupled to a first catalyst and a first exhaust gas sensor disposed downstream of the first catalyst. The first exhaust gas sensor generates a first signal. The method for monitoring the exhaust gas sensor includes supplying a first air-fuel mixture that is on average rich of stoichiometry to the first cylinder bank to remove oxygen stored in the first catalyst. The method further includes supplying a second air-fuel mixture that is on average lean of stoichiometry to said first cylinder bank to supply oxygen to the first catalyst. Finally, the method includes indicating that the first exhaust gas sensor is degraded when the first signal does not indicate a lean air-fuel ratio after supplying the second air-fuel mixture for a first predetermined time period.

A system for monitoring an exhaust gas sensor utilized in an engine is also provided. As discussed above, the engine includes a first cylinder bank coupled to a first catalyst. The system includes a first exhaust gas sensor disposed downstream of the first catalyst generating a first signal. The system further includes a controller operably coupled to the first exhaust gas sensor. The controller is configured to supply a first air-fuel mixture that is on average rich of stoichiometry to the first cylinder bank until the first signal indicates a rich air-fuel ratio. The controller is further configured to supply a second air-fuel mixture that is on average lean of stoichiometry to the first cylinder bank to supply oxygen to the first catalyst. Finally, the controller is configured to indicate the first exhaust gas sensor is degraded when the first signal does not indicate a lean air-fuel ratio after supplying the second air-fuel mixture for a first predetermined time period.

Thus, the inventive system and method can determine when a post-catalyst exhaust gas sensor becomes degraded.

DESCRIPTION OF EMBODIMENTS

Figure 1:
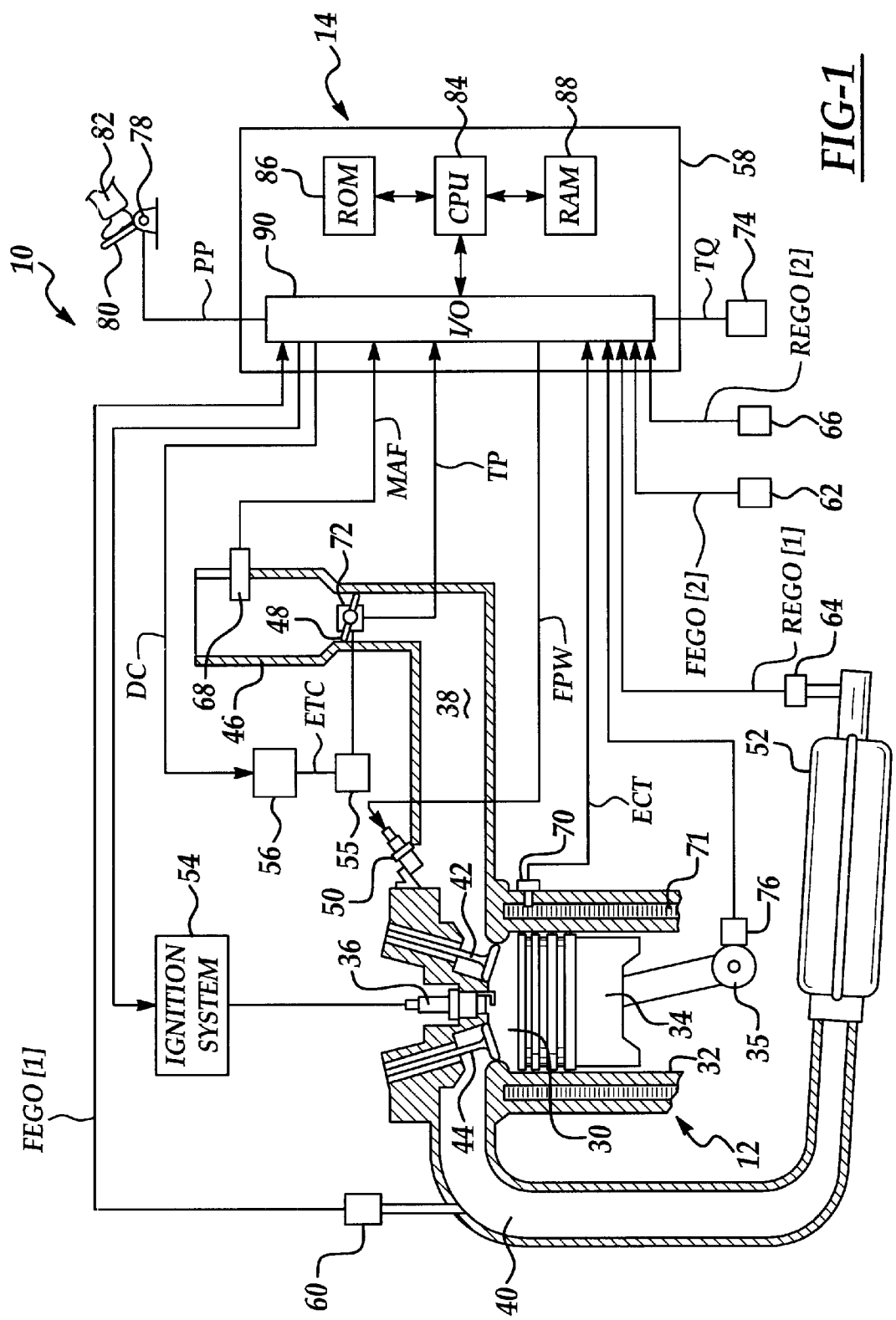
FIG. 1 is block diagram of an automotive vehicle having an engine and an engine control system.
Figure 2:
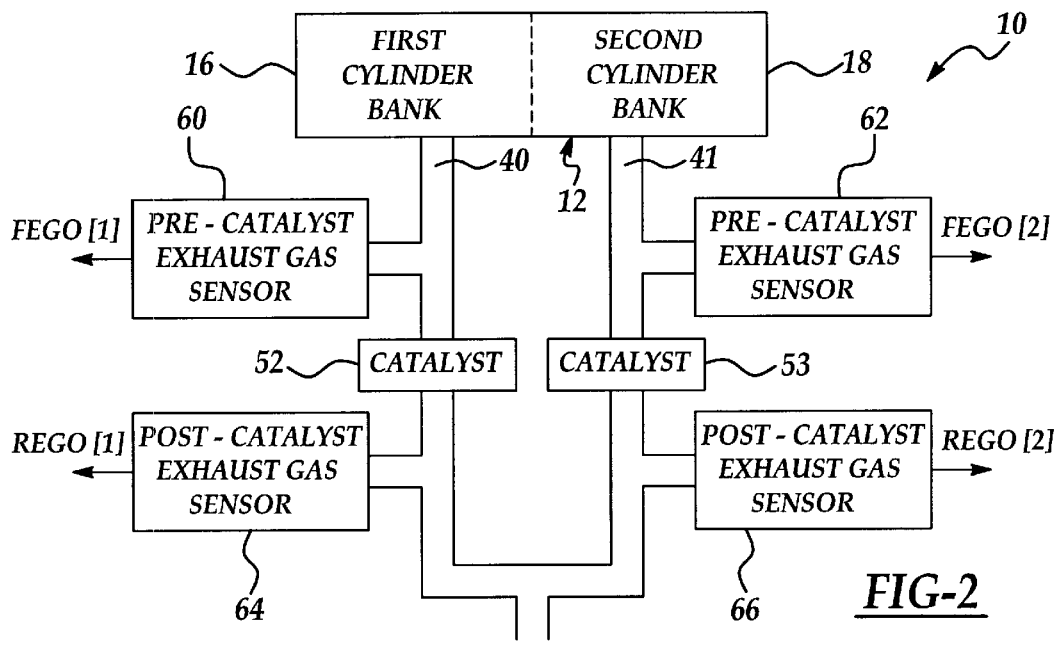
FIG. 2 is a block diagram the engine of FIG. 1 illustrating dual exhaust banks.

Referring now to the drawings, like reference numerals are used to identify identical components in the various views. Referring to FIGS. 1 and 2, an automotive vehicle 10 is shown that can be used to implement a method for monitoring a post-catalyst exhaust gas sensor in accordance with the present invention. Vehicle 10 includes an internal combustion engine 12 and an engine control system 14.

Engine 12 may comprise first and second cylinder banks 16, 18, each having a plurality of cylinders. Referring to FIG. 1, only one cylinder is shown of first cylinder bank 16 for purposes of clarity. Engine 12 further includes a combustion chamber 30, cylinder walls 32, a piston 34, a crankshaft 35, a spark plug 36, an intake manifold 38, exhaust manifolds 40, 41, an intake valve 42, an exhaust valve 44, a throttle body 46, a throttle plate 48, a fuel injector 50, and catalytic converters 52, 53.

Combustion chamber 30 communicates with intake manifold 38 and exhaust manifold 40 via respective intake and exhaust valves 42, 44. Piston 34 is positioned within combustion chamber 30 between cylinder walls 32 and is connected to crankshaft 35. Ignition of an air-fuel mixture within combustion chamber 30 is controlled via spark plug 36 which delivers ignition spark responsive to a signal from distributorless ignition system 54.

Intake manifold 38 communicates with throttle body 46 via throttle plate 48. Throttle plate 48 is controlled by electric motor 55 which receives a signal from ETC driver 56. ETC driver 56 receives a control signal (DC) from a controller 58. Intake manifold 38 is also shown having fuel injector 50 coupled thereto for delivering fuel in proportion to the pulse width of signal (FPW) from controller 58. Fuel is delivered to fuel injector 50 by a conventional fuel system (not shown) including a fuel tank, fuel pump, and fuel rail (now shown). Although port fuel injection is shown, direct fuel injection could be utilized instead of port fuel injection.

Referring to FIG. 2, exhaust manifolds 40, 41 communicate with catalysts 52, 53 respectively, which may comprise three-way catalytic converters for example. Catalysts 52, 53 reduce exhaust gas constituents such as nitrous oxides (NOx) and oxidizes carbon monoxide (CO) and hydrocarbons (HC). As illustrated, exhaust gas sensors 60, 62 are disposed upstream of catalysts 52, 53, respectively and exhaust gas sensors 64, 66 are disposed downstream of catalysts 52, 53, respectively. Exhaust gas sensors 60, 62, 64, 66 may comprise one of an EGO sensor, a HEGO sensor, or a UEGO sensor. Sensors 60, 62 may generate signals FEGO[1], FEGO[2], respectively, indicative of air/fuel ratios in exhaust gases upstream of catalysts 52, 53, respectively. Sensors 64, 66 may generate signals REGO[1], REGO[2], respectively, indicative of air/fuel ratios in exhaust gases downstream of catalysts 52, 53.

Referring to FIG. 1, control system 14 is provided to control the operation of engine 12 and to implement a method for monitoring post-catalyst exhaust gas sensors in accordance with the present invention. Control system 14 includes distributorless ignition system 54, an electric motor 55 for controlling the throttle plate 48, an ETC driver 56, exhaust gas sensors 60, 62, 64, 66, a mass air flow sensor 68, a temperature sensor 70, a throttle position sensor 72, a torque sensor 74, an engine speed sensor 76, a pedal position sensor 78, an accelerator pedal 80, and controller 58.

Mass air flow sensor 68 generates a signal indicating the inducted mass air flow (AM) that is transmitted to controller 58. Sensor 68 may be coupled to the throttle body 46 or intake manifold 38.

Temperature sensor 70 generates a signal indicating the engine coolant temperature (ECT) received by controller 58. Sensor 70 may be coupled to cooling jacket 71 in cylinder wall 36.

Throttle position sensor 72 generates a signal indicating a throttle position (TP) of throttle plate 48 received by controller 58 for closed-loop control of plate 48.

Torque sensor 74 generates a signal (TQ) that may indicate one of following torque values: (i) an engine crankshaft torque, ii) a transmission torque, such as for example, a torque converter turbine torque or a transmission output shaft torque, or (iii) an axle torque.

Engine speed sensor 76 may comprise a hall effect sensor that generates a signal (N) indicating an engine speed. Sensor 76 may be coupled to crankshaft 35 and transmits signal (N) to controller 58.

Accelerator pedal 80 is shown communicating with a driver's foot 82. Pedal position sensor 78 generates a signal indicating acceleration pedal position (PP) that is transmitted to controller 58.

The controller 58 is provided to implement the method for monitoring post-catalyst exhaust gas sensors in accordance with the present invention. The controller 58 includes a microprocessor 84 communicating with various computer-readable storage media. The computer readable storage media preferably include nonvolatile and volatile storage in a read-only memory (ROM) 86 and a random-access memory (RAM) 88. The computer readable media may be implemented using any of a number of known memory devices such as PROMs, EPROMs, EEPROMs, flash memory or any other electric, magnetic, optical or combination memory device capable of storing data, some of which represent executable instructions, used by microprocessor 84 in controlling engine 12. Microprocessor 84 communicates with various sensors and actuators (discussed above) via an input/output (I/O) interface 90. Of course, the present invention could utilize more than one physical controller to provide engine/vehicle control depending upon the particular application.

The underlying theory for determining degradation of a post-catalyst exhaust gas sensor will now be discussed. The inventors herein have recognized that when a first emission catalyst in a first catalytic converter is depleted of oxygen and subsequently starts receiving and storing oxygen from an upstream cylinder bank, an exhaust gas sensor downstream of the first catalyst should indicate a lean air-fuel ratio after supplying the oxygen for a predetermined amount of time. If the sensor does not indicate a lean air-fuel ratio after the predetermined amount of time, the exhaust gas sensor has become degraded. The inventors herein have further recognized that a second catalyst in a second catalytic converter may have an intermediate amount of stored oxygen when the first catalyst has no stored oxygen. In this case, when equal amounts of oxygen are subsequently supplied to both catalysts, the sensor downstream of the second catalyst should indicate a lean air-fuel ratio before the sensor downstream of the first catalyst. This occurs because the first catalyst can store more of the subsequently supplied oxygen as compared to the second catalyst.

Figure 3A:
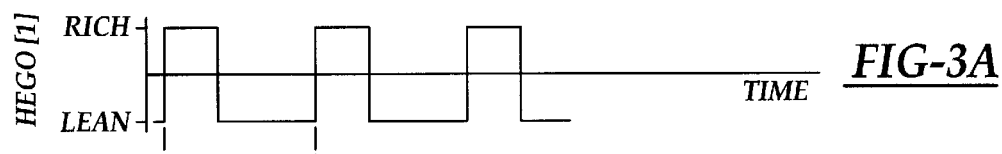
FIGS. 3A–3E are schematics of signals used to determine whether a post-catalyst exhaust gas sensor in a first exhaust bank is degraded.

Referring to FIGS. 3A–3E, the signals utilized or generated by controller 58 for monitoring post-catalyst exhaust gas sensors will be discussed. Referring to FIGS. 3A and 4A, the signals HEGO[1] and HEGO[2] are generated by sensors 60, 62, respectively. As discussed above, the signals HEGO[1] and HEGO[2] are indicative of combusted air-fuel ratios in cylinder banks 16, 18, respectively. As shown, signal HEGO[1] may transition to a high logic level when a measured oxygen concentration indicates a rich air-fuel ratio with respect to stoichiometry and a low logic level when the oxygen concentration indicates a lean air-fuel ratio with respect to stoichiometry. The signal HEGO[2] may transition between a high logic level and a low logic level in a manner similar to signal HEGO[1].

Figure 3B:
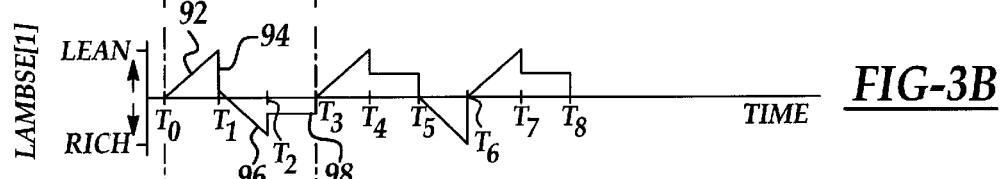
Figure 4A:
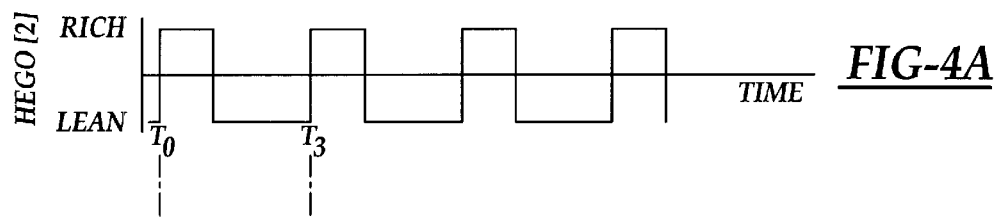
FIGS. 4A–4E are schematics of signals used to determine whether a post-catalyst exhaust gas sensor in a second exhaust bank is degraded.
Figure 4B:
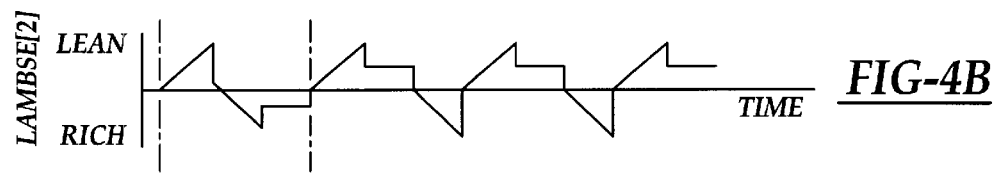

Referring to FIGS. 3B and 4B, the signals LAMBSE[1] and LAMBSE[2] are generated by controller 58 and are indicative of a desired air-fuel ratio for cylinder banks 16, 18, respectively. For purposes of clarity, the generation of signal LAMBSE[1] will be described, although those skilled in the art will recognize the signal LAMBSE[2] can be generated in a similar manner. Referring to FIGS. 3A and 3B, at time To, the desired air-fuel ratio is steadily increased over time, becoming more leaner, until the exhaust gas sensor 60 detects a lean air-fuel ratio in the exhaust gases. This portion of signal LAMBSE[1] is referred to as a ramp portion 92 because the air-fuel ratio is being ramped up during this time period. At time $T_1$, when sensor 60 detects the air-fuel ratio has switched to a lean state, LAMBSE[1] is abruptly dropped toward or past stoichiometry. This portion of signal LAMBSE[2] is referred to a jumpback portion 94. Thereafter, signal LAMBSE[1] is steadily decreased, becoming more and more rich, until the air/fuel ratio reaches a particular rich threshold value at time $T_2$.

Similar to when the air-fuel ratio steadily increases, this portion of signal LAMBSE[1] is referred to as a ramp portion 96.

At time $T_2$, if an air-fuel ratio is desired that is on average rich of stoichiometry (i.e., a rich fuel bias), based on signal REGO[1] for example, the signal LAMBSE[1] is held (after the jumpback) at a predetermined level to deliver a desired level of rich fuel bias. As illustrated, between times $T_2$–$T_3$, the signal LAMBSE[1] is maintained at a rich level to deliver the desired amount of rich fuel bias. This portion of signal LAMBSE[1] is referred to as a hold portion 98. Similarly, if an air-fuel ratio is desired that is on average lean of stoichiometry (i.e., a lean fuel bias), based on signal REGO[1] for example, the signal LAMBSE[1] is held (after the jumpback) at a particular level to deliver a desired amount of lean fuel bias. As illustrated, between times $T_4$–$T_5$, the signal LAMBSE[1] is maintained at a lean level to deliver a desired amount of lean fuel bias.

Those skilled in the art will recognize that signals LAMBSE[1], LAMBSE[2] may be generated based on signals HEGO[1], HEGO[2], respectively and signals REGO[1], REGO[2], respectively, using one of a plurality of known methods. For example, the method disclosed in commonly assigned U.S. Pat. No. 5,357,751 entitled "Air/ Fuel Control System Providing Catalytic Monitoring" may be utilized to generate signals LAMBSE[1] and LAMBSE [2], which is incorporated herein in its entirety.

Figure 3C:
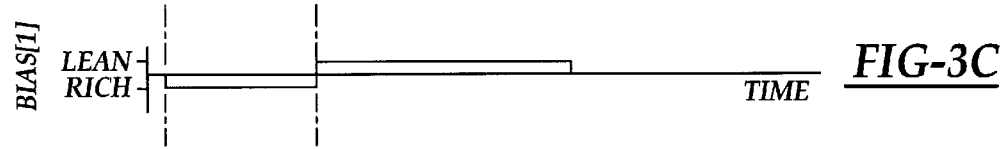
Figure 4C:
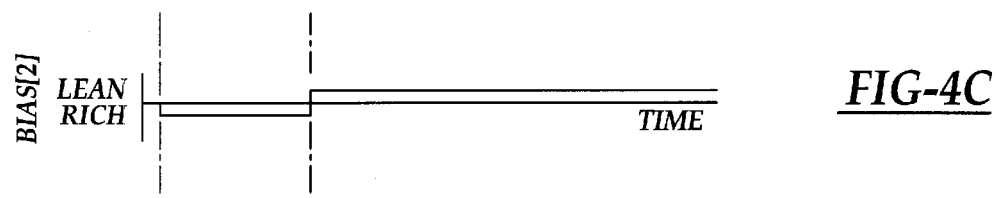

Referring to FIGS. 3C and 4C, the fuel bias signals BIAS[1] and BIAS[2] are generated by controller 58 and correspond to average air-fuel ratios delivered to cylinder banks 16, 18, respectively, by the signals LAMBSE[1], LAMBSE[2], respectively. In particular, each of signals BIAS[1] and BIAS[2] represent an average air-fuel ratio either lean or rich of stoichiometry. Referring to FIGS. 3B and 3C, for example, the area between signal BIAS[1] and the stoichiometric reference line between times $T_0$–$T_3$, corresponds to the area between signal LAMBSE[1] and a stoichiometric reference line between times $T_2$–$T_3$. Similarly, the area between signal BIAS[1] and the stoichiometric reference line between times $T_3$–$T_8$, corresponds to the area between signal LAMBSE[1] and the stoichiometric reference line between times $T_4$–$T_5$ and times $T_7$–$T_8$.

Figure 3D:
Figure 4D:

Referring to FIGS. 3D and 4D, the signals REGO[1] and REGO[2] generated by post-catalyst exhaust gas sensors 64, 66, respectively, are illustrated. When signal BIAS[1], for example, switches to a lean air-fuel state, it indicates that catalytic converter 52 is saturated with oxygen. In other words, the oxygen supplied to converter 52 (during delivery of a lean fuel bias) has completely oxidized the stored hydrocarbons (HC) and carbon monoxide (CO). Alternately, when signal BIAS[1] indicates a rich air-fuel state, it is indicative that catalytic converter 52 is saturated with HC and CO. In other words, the hydrocarbons supplied to converter 52 (during delivery of a rich fuel bias) have completely reduced the stored oxygen and NOx in converter 52.

Figure 3E:
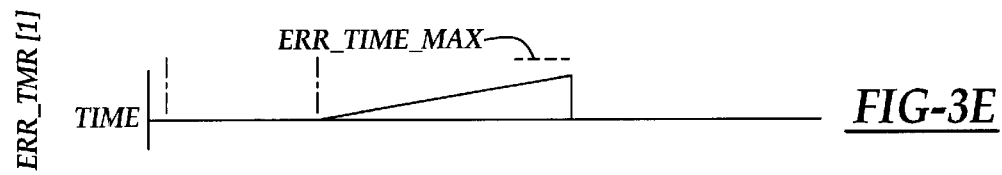
Figure 4E:
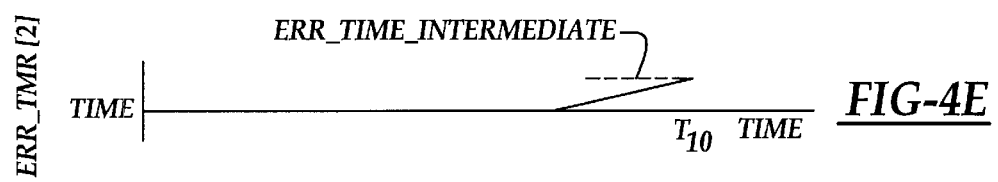

Referring to FIGS. 3E and 4E, the values ERR_TMR[1] and ERR_TMR[2] are calculated by controller 58. The values ERR_TMR[1] and ERR_TMR[2] may correspond an elapsed time during which lean air-fuel mixtures are supplied to cylinder banks 16, 18, respectively—as will be explained in greater detail below.

Figure 5A:
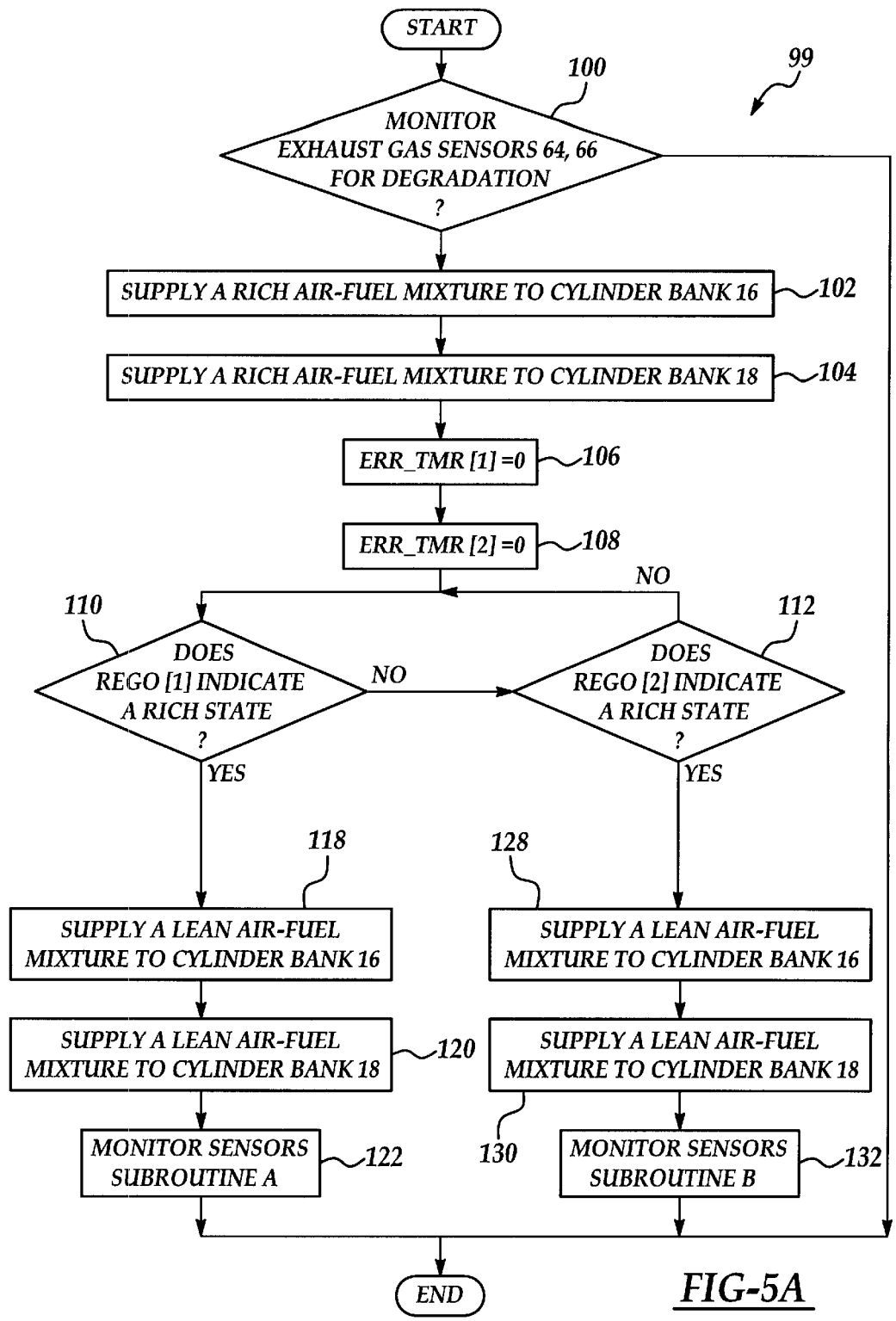
FIGS. 5A–5C are flowcharts of a method of determining degradation of post-catalyst exhaust gas sensors in accordance with the present invention.

Referring to FIG. 5A, a method 99 for monitoring post-catalyst exhaust gas sensors 64, 66 in accordance with the present invention is illustrated. At step 100, a determination is made as to whether to monitor exhaust gas sensors 64, 66 for degradation. If the sensors 64, 66 are to be monitored, the method advances to step 102. Otherwise, the method is exited.

At step 102, an air-fuel mixture that is on average rich of stoichiometry, represented by signal BIAS[1], is delivered to cylinder bank 16. Referring to FIG. 3C, for example, at time $T_0$ the signal BIAS[1] switches to a rich state indicating that a rich air-fuel mixture is being delivered to cylinder bank 16.

Referring again to FIG. 5A, at step 104 an air-fuel mixture that is on average rich of stoichiometry, represented by signal BIAS[2], is delivered to cylinder bank 18. Referring to FIG. 4C, for example, at time $T_0$ the signal BIAS[2] switches to a rich state indicating that a rich air-fuel mixture is being delivered to cylinder bank 18. Thus, steps 102 and 104 are purging stored oxygen from catalytic converters 52, 53. Thereafter, the method advances to step 106.

At step 106 the timer ERR_TMR[1] is initialized and at step 108 the timer ERR_TMR[2] is also initialized. Thereafter, the method advanced to step 110.

At step 110, a determination is made as to whether the signal REGO[1] indicates a rich air-fuel ratio. If the value of step 110 equals "Yes", the method advances to step 118, otherwise the method advances to step 112.

At step 118, an air-fuel mixture that is on average lean of stoichiometry, represented by signal BIAS[1], is delivered to cylinder bank 16. Referring to FIG. 3C, for example, at time $T_3$ the signal BIAS[1] switches to a lean state indicating that a lean air-fuel mixture is being delivered to cylinder bank 16.

Referring again to FIG. 5A, at step 120 an air-fuel mixture that is on average lean of stoichiometry, represented by signal BIAS[2], is delivered to cylinder bank 18. Referring to FIG. 4C, for example, at time $T_2$ the signal BIAS[2] switches to a lean state indicating that a lean air-fuel mixture is being delivered to cylinder bank 18. Thus, steps 118 and 120 are supplying oxygen to catalytic converters 52, 53, respectively, since by definition lean air-fuel mixtures result in un-combusted oxygen being expelled from cylinder banks 16, 18.

Figure 5B:
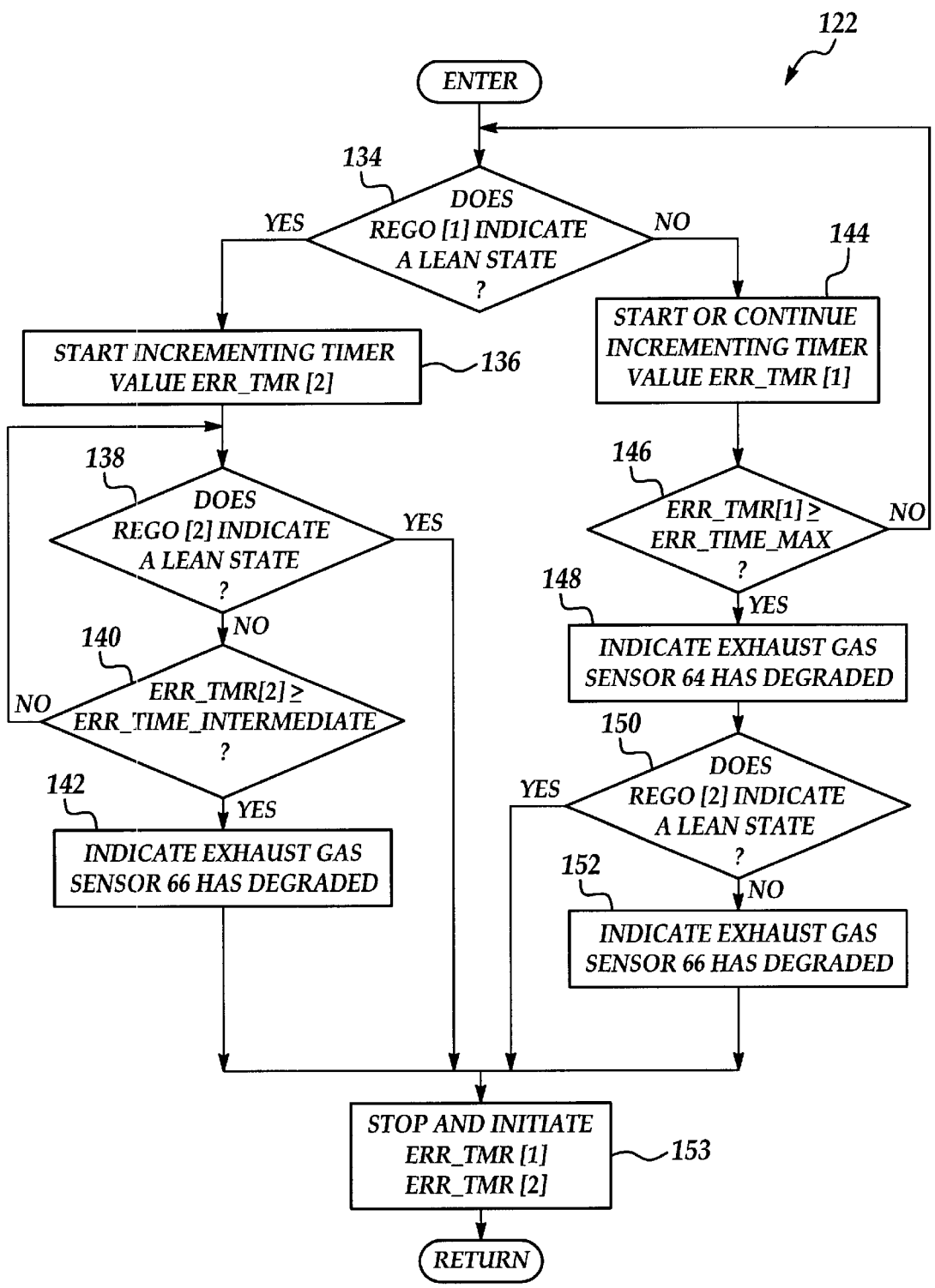

Next at step 122, the Monitor Sensors SubroutineA is executed. Referring to FIG. 5B, the subroutine will now be explained. At step 134, a determination is made as to whether the signal REGO[1] indicates a lean air-fuel ratio. If the value of step 134 equals "Yes", the subroutine advances to step 136, which starts incrementing the timer value ERR_TMR[2]. Otherwise, the subroutine advances to step 144.

At step 138 following step 136, a determination is made as to whether the signal REGO[2] indicates a lean air-fuel ratio. If the value of step 138 equals "Yes", the subroutine is exited. Otherwise, the subroutine advances to step 140.

At step 140, a determination is made as to whether the timer value ERR_TMR[2] is greater than or equal to a predetermined threshold time ERR_TIME_INTERMEDIATE. The value of ERR_TIME_INTERMEDIATE may be empirically determined and may be for example equal to 10% of the value ERR_TIME_MAX. If the value of step 140 equals "Yes", the step 142 indicates that sensor 66 is degraded and the method advances to step 153 which stops and initializes the timer values ERR_TMR[1] AND ERR_TMR[2]. Otherwise, the subroutine returns to step 138 to continue monitoring exhaust sensor 66 for degradation.

Referring again to step 134, if the signal REGO[1] does not indicate a lean air-fuel ratio, the subroutine advances to step 144.

At step 144, the step starts or continues to incrementing timer value ERR_TMR[1]. Thereafter at step 146, a determination is made as to whether timer value ERR_TMR[1] is greater than or equal to the threshold value ERR_TIME_MAX. The value ERR_TIME_MAX is a calibratable value and is determined as a function of the air mass AM. For example, the value ERR_TIME_MAX may be 4.0 seconds for an air mass flow rate AM of 1.0 lb. air/minute. If the value of step 146 equals "Yes", the method advances to step 148 which indicates that the exhaust gas sensor 64 has degraded. Otherwise, the subroutine returns to step 134 for continued sensor monitoring.

After step 148, the step 150 makes a determination as to whether signal REGO[2] indicates a lean air-fuel ratio. If the value of step 150 equals "Yes", the subroutine advances to step 153 which resets timer values ERR_TMR[1] and ERR_TMR[2]. Otherwise, the step 152 indicates that exhaust gas sensor 66 is degraded and thereafter the step 153 is executed. After step 153, the subroutine is exited.

Referring again to FIG. 5A, if the step 110 determines that the signal REGO[1] does not indicate a rich air-fuel ratio, the method advances to step 112.

At step 112, a determination is made as to whether signal REGO[2] indicates a rich air-fuel ratio. If the value of step 112 equals "Yes", the method advances to step 128. Otherwise, the method returns to step 110 for continued monitoring of the signal REGO[1].

At step 128, an air-fuel mixture that is on average lean of stoichiometry, represented by signal BIAS[1], is delivered to cylinder bank 16.

Next at step 130 an air-fuel mixture that is on average lean of stoichiometry, represented by signal BIAS[2], is delivered to cylinder bank 18. Thus, steps 128 and 130 are supplying oxygen to catalytic converters 52, 53, respectively.

Figure 5C:
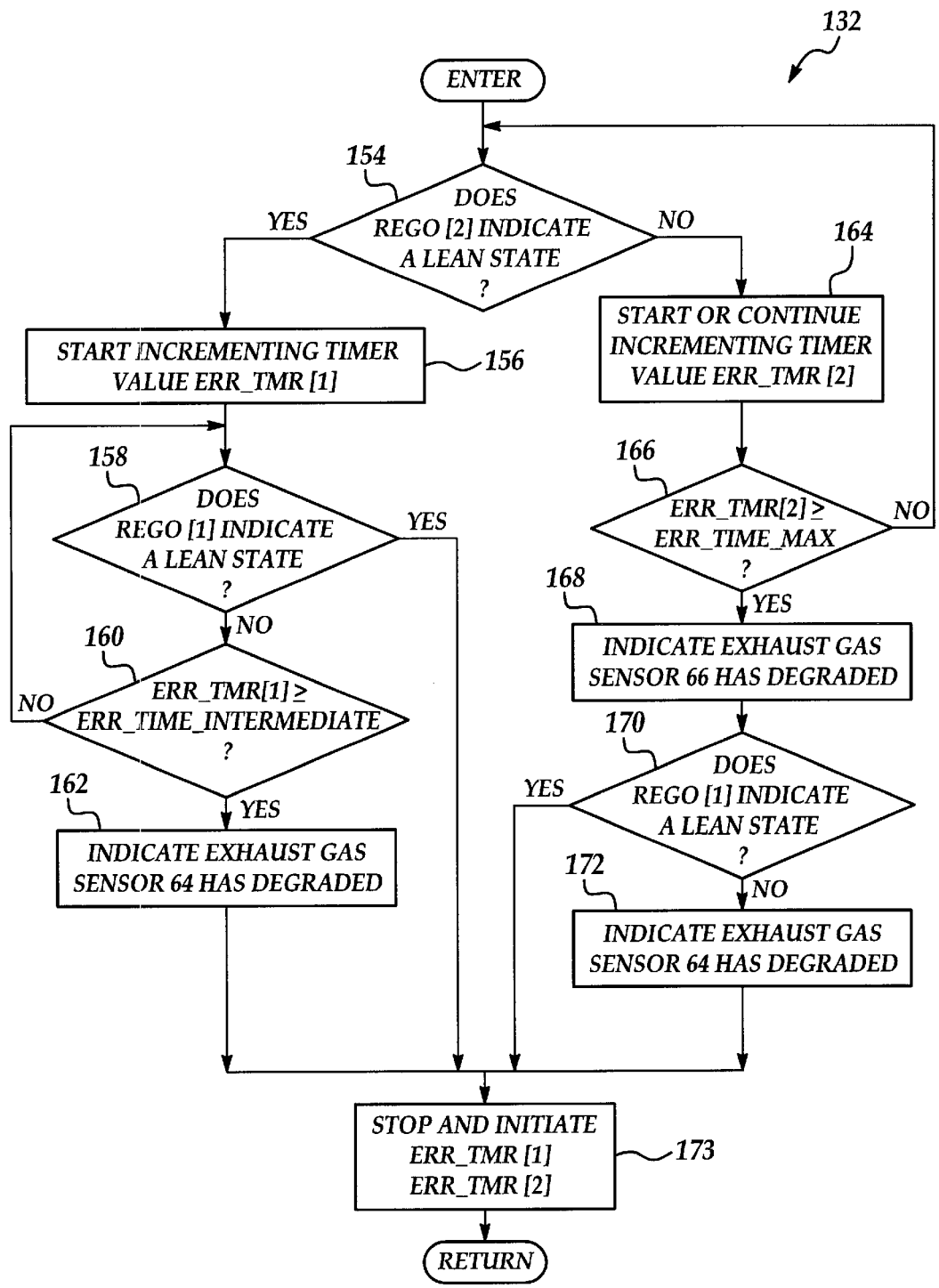

Next at step 132, the Monitor Sensors SubroutineB is executed. Referring to FIG. 5C, the subroutine will now be explained. At step 154, a determination is made as to whether the signal REGO[2] indicates a lean air-fuel ratio. If the value of step 154 equals "Yes", the subroutine advances to step 156, which starts incrementing the timer value ERR_TMR[1]. Otherwise, the subroutine advances to step 164.

At step 158 following step 156, a determination is made as to whether the signal REGO[1] indicates a lean air-fuel ratio. If the value of step 158 equals "Yes", the subroutine is exited. Otherwise, the subroutine advances to step 160.

At step 160, a determination is made as to whether the timer value ERR_TMR[1] is greater than or equal to a predetermined threshold time ERR_TIME_INTERMEDIATE. If the value of step 160 equals "Yes", the step 162 indicates that sensor 64 is degraded and the subroutine advances to step 173 which stops and initializes the timer values ERR_TMR[1] AND ERR_TMR[2]. Otherwise, the subroutine returns to step 158 to continue to monitor exhaust sensor 64 for degradation.

Referring again to step 154, if the signal REGO[2] does not indicate a lean air-fuel ratio, the subroutine advances to step 164.

At step 164, the step starts or continues to incrementing timer value ERR_TMR[2]. Thereafter at step 166, a determination is made as to whether timer value ERR_TMR[2] is greater than or equal to the threshold value ERR_TIME_MAX. If the value of step 166 equals "Yes", the subroutine advances to step 168 which indicates that exhaust gas sensor 66 has degraded. Otherwise, the subroutine returns to step 154 for continued sensor monitoring.

After step 168, a step 170 makes a determination as to whether signal REGO[1] indicates a lean air-fuel ratio. If the value of step 170 equals "Yes", the subroutine advances to step 173 which resets timer values ERR_TMR[1] and ERR_TMR[2]. Otherwise, the step 172 indicates exhaust gas sensor 62 is degraded and thereafter the step 173 is executed. After step 173, the subroutine is exited.

Referring again to FIG. 5A, after either subroutine 122 or subroutine 132 is completed, the method 99 is exited.

Referring again to FIGS. 3E—3E and 4A–4E, the signal schematics illustrate how the inventive method 99 monitors exhaust gas sensors 64, 66. Referring to FIGS. 3C and 4C between times T0-$T_3$, controller 58 utilizes steps 102, 104 to supply a rich fuel bias represented by signals BIAS[1] and BIAS[2], respectively, to engine cylinder banks 64, 66, respectively. As discussed above, the rich fuel bias is supplied to reduce the amount of stored oxygen in converters 52, 53.

Referring to FIG. 3D, at time $T_3$, signal REGO[1] generated by sensor 64 transitions to a high logic level indicative of a rich air-fuel ratio being measured in the exhaust gases. In response, controller 58 utilizes steps 118 and 120 to supply a lean fuel bias also represented by signals BIAS[1] and BIAS[2], respectively, to engine cylinder banks 64, 66, respectively. As discussed above, the lean fuel bias allows non-combusted oxygen to be supplied to converters 52, 53.

Referring to FIG. 3E, while the lean fuel bias is being delivered to cylinder banks, 64, 66, controller 58 utilizes step 144 to start incrementing timer ERR_TMR[1] to determine an amount of time needed for exhaust gas sensor 64 to indicate a lean air-fuel ratio. At time $T_8$, the signal REGO[1] indicates a lean air-fuel ratio. Because the timer value ERR_TMR[1] is less than threshold value ERR_TIMEMAX, sensor 64 is determined to be non-degraded.

Referring to FIG. 4E, after the signal REGO[1] indicates a lean air-fuel ratio at time T8, controller 58 utilizes step 136 to start incrementing timer ERR_TMR[2] to determine an amount of time needed for exhaust gas sensor 66 to indicate a lean air-fuel ratio in the exhaust gases. However, at time $T_{10}$, the value of ERR_TMR[2] is greater than the threshold value ERR_TIME_INTERMEDIATE. Thus, controller 58 utilizes step 142 to indicate that the exhaust gas sensor 66 is degraded.

The system 14 and method 99 for determining degradation of post-catalyst exhaust gas sensors in accordance with the present invention provide a substantial advantage over conventional systems and methods. In particular, the system 14 and method 99 can accurately determine post-catalyst sensor degradation without assuming the post-catalyst sensors are non-degraded as done by known systems and methods. Thus, an engine control systems may ignore an output signal from an identified degraded sensor to more accurately control air-fuel delivery to the engine cylinders—resulting in decreased emissions and increased fuel economy.

I claim:
1. A method for monitoring an exhaust gas sensor utilized in an engine, said engine having a first cylinder bank coupled to a first catalyst and a first exhaust gas sensor disposed downstream of said first catalyst, said first exhaust gas sensor generating a first signal, said method comprising:
supplying a first air-fuel mixture that is on average rich of stoichiometry by adjusting fuel injection to the engine, said first air-fuel mixture supplied to said first cylinder bank until an amount of oxygen stored in said first catalyst is depleted;

supplying a second air-fuel mixture that is on average lean of stoichiometry by adjusting fuel injection to said engine, said second air-fuel mixture supplied to said first cylinder bank to supply oxygen to said first catalyst;

indicating said first exhaust gas sensor is degraded when said first signal does not indicate a lean air-fuel ratio after supplying said second air-fuel mixture for a first predetermined time period; and wherein said engine includes a second cylinder bank coupled to a second catalyst and a second exhaust gas sensor disposed downstream of said second catalyst, said second exhaust gas sensor generating a second signal, said method further comprising:

supplying a third air-fuel mixture that is on average rich of stoichiometry to said second cylinder bank to reduce an amount of oxygen stored in said second catalyst;

supplying a fourth air-fuel mixture that is on average lean of stoichiometry to said second cylinder bank to supply oxygen to said second catalyst; and, indicating said second exhaust gas sensor is degraded when said second signal does not indicate a lean air-fuel ratio within a second predetermined time period after said first predetermined time period.

2. The method of claim 1 wherein said first predetermined time period is greater than said second predetermined time period.

3. The method of claim 1 wherein said second and fourth lean air-fuel mixtures are supplied to said first and second cylinder banks, respectively, after said oxygen stored in said first catalyst is depleted.

4. A system for monitoring an exhaust gas sensor utilized in an engine, said engine having a first cylinder bank coupled to a first catalyst, said system comprising:

a first exhaust gas sensor disposed downstream of said first catalyst generating a first signal; and, a controller operably coupled to said first exhaust gas sensor, said controller configured to supply a first air-fuel mixture that is on average rich of stoichiometry to said first cylinder bank until said first signal indicates a rich air-fuel ratio, said controller being further configured to supply a second air-fuel mixture that is on average lean of stoichiometry to said first cylinder bank to supply oxygen to said first catalyst, said controller being further configured to indicate said first exhaust gas sensor is degraded when said first signal does not indicate a lean air-fuel ratio after supplying said second air-fuel mixture for a first predetermined time period; and wherein said engine further includes a second cylinder bank coupled to a second catalyst, said system further comprising:

a second exhaust gas sensor disposed downstream of said second catalyst generating a second signal; and said controller being further configured to supply a third air-fuel mixture that is on average rich of stoichiometry to said second cylinder bank to reduce an amount of oxygen stored in said second catalyst, said controller being further configured to supply a fourth air-fuel mixture that is on average lean of stoichiometry to said second cylinder bank to supply oxygen to said second catalyst, said controller being further configured to indicate said second exhaust gas sensor is degraded when said second signal does not indicate a lean air-fuel ratio within a second predetermined time period after said first predetermined time period.

5. An article of manufacture, comprising:

a computer storage medium having a computer program encoded therein for monitoring an exhaust gas sensor utilized in an engine, said engine having a first cylinder bank coupled to a first catalyst and a first exhaust gas sensor disposed downstream of said first catalyst, said first exhaust gas sensor generating a first signal, said computer storage medium comprising:

code for supplying a first air-fuel mixture that is on average rich of stoichiometry to said first cylinder bank until said first signal indicates a rich air-fuel ratio;

code for supplying a second air-fuel mixture that is on average lean of stoichiometry to said first cylinder bank to supply oxygen to said first catalyst; and, code for indicating said first exhaust gas sensor is degraded when said first signal does not indicate a lean air-fuel ratio within a first predetermined time period; and wherein said engine includes a second cylinder bank coupled to a second catalyst and a second exhaust gas sensor disposed downstream of said second catalyst, said second exhaust gas sensor generating a second signal, said computer storage medium farther comprising:

code for supplying a third air-fuel mixture that is on average rich of stoichiometry to said second cylinder bank to reduce an amount of oxygen stored in said second catalyst;

code for supplying a fourth air-fuel mixture that is on average lean of stoichiometry to said second cylinder bank to supply oxygen to said second catalyst; and, code for indicating said second exhaust gas sensor is degraded when said second signal does not indicate a lean air-fuel ratio within a second predetermined time period after said first predetermined time period.

6. The article of manufacture of claim 5 wherein said first predetermined time period is greater than said second predetermined time period.

7. The article of manufacture of claim 5 wherein said second and fourth lean air-fuel mixtures are applied to said first and second cylinder banks, respectively, when said first signal indicates a lean air-fuel ratio.

* * * * *